Patented Sept. 3, 1946

2,406,960

UNITED STATES PATENT OFFICE 2,406,960

PREPARATION OF HEAVY METAL SALTS OF DITHIOCARBAMIC ACIDS

Arthur M. Neal, Wilmington, Del., and Bernard M. Sturgis, Pitman, N. J., assignors to E. I. du Pont de Nemours & Company, Wilmington, Del., a corporation of Delaware No Drawing. Application August 22, 1942, Serial No. 455,784

17 Claims. (Cl. 260—239)

This invention relates to the preparation of heavy metal salts of dithiocarbamic acids and more particularly to a process for preparing heavy metal salts of dithiocarbamic acids of improved appearance and quality.

Heavy metal salts, particularly zinc salts, of dithiocarbamic acids have long been used as accelerators for the vulcanization of rubber. These compounds are very effective in the vulcanization of both dry rubber and rubber latex. For use in dry rubber, these dithiocarbamates must be in the form of very finely divided powders, free from lumps or agglomerates, in order that they may be dispersed thoroughly and uniformly throughout the rubber. The presence of lumps of accelerator in the rubber results in spotty and uneven cures, giving inferior vulcanizates. For use in rubber latex also, a finely divided powder is desired. In the preparation of zinc salts of dithiocarbamic acids, a white color is desired for the product. The presence of brown specks or lumps throughout the product is obviously disadvantageous in the compounding of white or light colored rubber stocks. Furthermore, the presence of impurities in the product is very detrimental since these impurities tend to activate or retard the accelerator and thus affect the rate of cure of the compounded rubber.

Heavy metal salts of dithiocarbamic acids, particularly zinc salts, form a well known class of chemical compounds. The usual method of preparing such compounds consist first in the preparation of an aqueous solution of a soluble dithiocarbamate by reacting an amine with carbon disulfide and a base such as an alkali metal hydroxide. This solution of soluble dithiocarbamate is then treated with a soluble salt of a heavy metal, such as zinc sulfate, whereupon the heavy metal salt of the dithiocarbamic acid precipitates and is filtered off and dried. This process is relatively simple, but does not always lead to a satisfactory product.

In the preparation of these heavy metal salts of dithiocarbamic acids by the usual methods, the resulting product is often lumpy and full of hard granules and agglomerates which are exceedingly difficult to break up. Often, the product will be waxy in nature or form waxy lumps that are difficult to filter and dry. Sometimes the heavy metal salts tend to precipitate in a gummy form, sticking to the agitator and the sides of the reaction vessel and forming soft balls. Some of them, especially if the amine used in preparing the dithiocarbamic acid was not entirely pure, give heavy metal salts containing brown specks or lumps or other impurities. Products, possessing these various defects, are inferior in quality and require extra costly steps, such as grinding and screening, in order to render them satisfactory for use.

It is an object of the present invention to provide an improved process for preparing heavy metal salts of dithiocarbamic acids. Another object is to provide a process for the preparation of heavy metal salts of dithiocarbamic acids with improved appearance and of better quality particularly adapted for use as accelerators for the vulcanization of rubber. A further object is to provide a process for preparing heavy metal salts of dithiocarbamic acids of higher purity and more uniformly finely divided character which will more readily disperse in rubber. A still further object is to provide a method for preparing heavy metal salts of dithiocarbamic acids from more highly concentrated solutions of soluble dithiocarbamates. Other objects are to advance the art. Still other objects will appear hereinafter.

The above and other objects of our invention may be accomplished by precipitating a heavy metal salt of a dithiocarbamic acid from a solution of a soluble salt of the dithiocarbamic acid in the presence of a salt of a strong base and a weak acid. We have found that, by incorporating a small proportion of a water-soluble salt of a strong base and a weak acid in the aqueous solution of a water-soluble salt of the dithiocarbamic acid before adding a water-soluble salt of the heavy metal for the purpose of precipitating the heavy metal salt of the dithiocarbamic acid, a great improvement in the appearance, purity, particle size and general quality of the heavy metal salts of the dithiocarbamic acids can be obtained. Under such circumstances, the heavy metal salts of the dithiocarbamic acids are usually precipitated in a much finer form, free of lumps and agglomerates, free from waxy and sticky materials and free from brown specks and like impurities. We have also found that, by employing the small amount of the salt of a strong base and a weak acid, we can employ higher concentrations of reactants than have been permissible heretofore since the precipitate is obtained in a finer form whereby it can be readily agitated. Heretofore, it has been necessary to precipitate the heavy metal salts from quite dilute solutions of the dithiocarbamates as otherwise the precipitate would become so thick that it could not be agitated with any degree of success. Furthermore, by carrying out the process in accordance with our invention, it is possible to prepare satisfactory heavy metal salts of dithiocarbamic acids where the soluble dithiocarbamates have been prepared from amines of somewhat lower purity than was heretofore possible.

Our improved process may be employed to advantage in the preparation of the heavy metal salts from any of the common water-soluble salts of dithiocarbamic acids, but is particularly adapted to the preparation of the heavy metal salts of N-aliphatic dithiocarbamic acids. The dithiocarbamic acids are represented by the formula

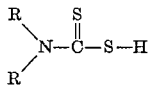

wherein at least one R represents an organic group and the other R represents hydrogen or an organic group and wherein both R's together may represent a cyclic group. Each R may represent an aliphatic radical or the two R's may represent a hydrocarbon chain having the terminal carbon atoms thereof attached to the nitrogen to form a heterocyclic ring, as in hexamethylene dithiocarbamic acid and pentamethylene dithiocarbamic acid, wherein hexamethylene and pentamethylene mean the divalent radicals $-CH_2(CH_2)_4CH_2-$ and $-CH_2(CH_2)_3CH_2-$, respectively.

The water-soluble salts of the dithioarbamic acids include sodium, potassium, calcium, barium, ammonium and amine salts. As is usual in such a process, it will generally be preferred to employ the sodium salts of the dithiocarbamic acids. Also, as is usual, the soluble salts of the dithiocarbamic acids will be dissolved in an aqueous solvent, preferably water, in the desired concentration. These solutions may contain 10% or less of the soluble salts of the dithiocarbamic acids. However, in our process it is possible to employ more highly concentrated solutions of the soluble dithiocarbamates and we preferably employ solutions containing from about 10% to about 30% of the soluble dithiocarbamates. Also, the solutions should have a pH above 7 and preferably a pH of from 7 to about 11.5.

Any of the water-soluble heavy metal salts, ordinarily employed as the precipitating agents in the manufacture of heavy metal salts of dithiocarbamic acids, may be employed. It is only necessary that the heavy metal salt, in solution, will form heavy metal ions which will be available for precipitation and that the heavy metal will form stable salts with the dithiocarbamic acids. Suitable heavy metals are zinc, cadmium, mercury, lead, iron and the like. We have found our invention to be particularly adapted to the manufacture of zinc salts of the dithiocarbamic acids. The heavy metal salts may be any non-oxidizing metal salts which are of sufficient solubility for the purpose. Such heavy metal salts are well known to the art. Our invention is particularly applicable where the precipitating agent is a heavy metal salt of a strong acid such as sulfuric acid and hydrochloric acid. However, it is also applicable where the precipitant is a heavy metal salt of a weak acid such as, for example, lead acetate.

Our improvement comprises incorporating into the solution of the water-soluble dithiocarbamate, prior to precipitation by the addition of the water-soluble heavy metal salt, a small proportion of a salt of a strong base and a weak acid. By a strong base, we mean a base having a dissociation constant at least as great as $1 \times 10^{-2}$. By a weak acid, we mean an inorganic acid or a monocarboxylic organic acid having a dissociation constant between $1 \times 10^{-6}$ and $1 \times 10^{-3}$ and dibasic organic acids having dissociation constants between $1 \times 10^{-6}$ and $5 \times 10^{-2}$. Suitable bases are sodium hydroxide, potassium hydroxide, lithium hydroxide, tetra-methyl ammonium hydroxide and the like. Suitable acids include particularly acetic acid, propionic acid, butyric acid, isobutyric acid, caproic acid, valeric acid, capric acid, salicylic acid, oxalic acid, formic acid, fumaric acid, lactic acid and the like. We particularly prefer the salts of the strong bases with the weak lower saturated aliphatic acids. By lower aliphatic acids, we mean those containing from 1 to 6 carbon atoms. The preferred salt of a strong base and a weak acid is sodium acetate.

The salts of the strong bases and weak acids will generally be employed in the proportion of from about 1% to about 20% based on the weight of the soluble dithiocarbamate. Preferably, we employ the salt in the proportion of from about 6% to about 15% of the weight of the soluble dithiocarbamate. Generally, the addition of from about 1 to about 3 parts of the salt to each 100 parts of solution will provide the desired amount of salt. By a water-soluble salt of a strong base and a weak acid, we mean one which is soluble in water to the extent of at least 1%. Also, it is usually desired that the salt be derived from a weak acid which is soluble in water to the extent of at least 2% so as to avoid contamination of the precipitate with acid which may be liberated during the reaction.

In order to more clearly illustrate our invention, the preferred modes of carrying the same into effect and the advantageous results to be obtained thereby, the following examples are given:

*Example I*

200 parts of a 10% solution of sodium hexamethylene dithiocarbamate, having a pH of 9.0, was stirred at 30° C. while a 20% solution of zinc sulfate was slowly dropped in until precipitation was complete. A rather gel-like precipitate was formed which later became lumpy. The precipitate stuck to the stirrer and the reaction vessel, and, after filtration and drying, was lumpy and full of small hard particles.

*Example II*

To 200 parts of the sodium hexamethylene dithiocarbamate solution of Example I was added 2 parts of sodium acetate. The resulting solution had a pH of 8.8. A 20% solution of zinc sulfate was then added with stirring at 30° C. until precipitation was complete. The resulting precipitate did not stick to the stirrer or the reaction vessel, and came down in a more finely divided form. After drying, the zinc hexamethylene dithiocarbamate contained no lumps or hard particles and was much softer and finer than that of Example I.

*Example III*

200 parts of a 10% sodium hexamethylene dithiocarbamate solution, having a pH of 7.5, was treated with 20% zinc sulfate as in Example I. The product was full of hard brown lumps.

*Example IV*

To 200 parts of the sodium hexamethylene dithiocarbamate solution of Example III was added 2 parts of sodium acetate. The resulting solution had a pH of 8.8. The zinc hexamethylene dithiocarbamate was then precipitated as before. It was a soft white powder containing no brown specks or lumps.

Example V 200 parts of a 10% solution of sodium dibutyl dithiocarbamate was made just neutral to phenolphthalein, a pH of 10.0, and a 20% solution of zinc sulfate added with stirring. The resulting zinc dibutyl dithiocarbamate was full of hard lumps after drying.

Example VI

The process of Example V was repeated except that 3 parts of sodium formate was added to the sodium dibutyl dithiocarbamate solution, producing a pH of 9.9, before precipitation. The resulting zinc dibutyl dithiocarbamate was a fine white powder containing no lumps or hard particles.

Example VII

The process of Example V was repeated except that 2.5 parts of sodium oxalate was added, producing a pH of 10.0. The resulting zinc dibutyl dithiocarbamate was a fine white powder.

Example VIII

The process of Example V was repeated except that 2 parts of disodium salicylate was added before precipitation, producing a pH of 11.4. The resulting product was a white powder free from lumps.

Example IX 150 parts of a 30% aqueous solution of sodium hexamethylene dithiocarbamate, having a pH of 9.0, was stirred at 27° C. while a 20% solution of zinc sulfate was slowly dropped in. A rather curdy precipitate was formed, and, before the reaction was complete, the contents of the beaker became too thick to stir and the addition of zinc sulfate had to be stopped.

Example X

The process of Example IX was repeated except that 3 parts of sodium acetate were added to the sodium hexamethylene dithiocarbamate solution, producing a pH of 8.8, before precipitation. The precipitate came down in a much finer form and no difficulty was experienced with the agitation at any time during the reaction.

Example XI 200 parts of a 10% solution of sodium diethanol dithiocarbamate was made just basic to phenolphthalein, a pH of 10.5, and then precipitated with 20% zinc sulfate solution while being rapidly stirred. The product was very gummy and sticky. It filtered with great difficulty, and remained gummy after drying.

Example XII

The process of Example XI was repeated except that 3 parts of sodium acetate was added before precipitation, producing a pH of 9.0. The resulting zinc diethanol dithiocarbamate was in the form of a fine white powder which filtered well and dried to give a satisfactory product.

Example XIII 50 parts of a crude aqueous solution of hexamethylene imine, containing 37% hexamethylene imine, 2.5% ammonia, and small amounts of a number of impurities was converted into sodium hexamethylene dithiocarbamate by reaction with carbon disulfide and sodium hydroxide. This dithiocarbamate solution, having a pH of 11.0, was stirred at room temperature while a 10% solution of zinc chloride was added. The resulting precipitate contained considerable gummy and waxy material and was entirely unsatisfactory.

Example XIV

The process of Example XIII was repeated except that 1 part of sodium acetate was added to the soluble dithiocarbamate, producing a pH of 9.1, before precipitation. The resulting zinc hexamethylene dithiocarbamate was in the form of a fine white powder of satisfactory appearance and quality.

Example XV 100 parts of a 15% solution of sodium diamyl dithiocarbamate, having a pH of 9.5, was precipitated with a 15% solution of cadmium chloride. The resulting cadmium diamyl dithiocarbamate was lumpy and unsatisfactory.

Example XVI

The process of Example XV was repeated except that 1 part of sodium acetate was added to the sodium diamyl dithiocarbamate solution before precipitation, producing a pH of 8.9. The cadmium diamyl dithiocarbamate produced was in the form of a finely divided yellow powder.

It will be understood that the foregoing examples are given for illustrative purposes only and that our invention is not to be limited to the specific embodiments disclosed therein. Many variations and modifications can be made, particularly in the ingredients and conditions employed, without departing from the spirit or scope of our invention. For example, other heavy metal salts of other dithiocarbamic acids may be prepared in accordance with our invention. Some of such other heavy metal dithiocarbamates are:

Cadmium di-n-propyl dithiocarbamate
Cadmium cyclohexyl dithiocarbamate
Mercuric hexamethylene dithiocarbamate
Zinc diamyl dithiocarbamate
Cadmium dibenzyl dithiocarbamate
Zinc dibenzyl dithiocarbamate
Zinc diallyl dithiocarbamate
Lead 2-methyl pentamethylene dithiocarbamate
Ferric dibutyl dithiocarbamate
Lead pentamethylene dithiocarbamate
Ferric pentamethylene dithiocarbamate It will be apparent that, by our invention, we have provided an improved method for the preparation of heavy metal salts of dithiocarbamic acids from the water-soluble salts of such acids, whereby products of greatly improved appearance and quality are obtained. Furthermore, by our invention, we have made it possible to employ more highly concentrated solutions of the soluble dithiocarbamates and also to employ solutions of lower purity while still obtaining highly satisfactory products. We, therefore, believe that our invention constitutes a very material advance in the art.

We claim:

1. The process of preparing a heavy metal salt of a dithiocarbamic acid which comprises adding from about 1% to about 20% of a water-soluble salt of a strong base and a weak acid to an aqueous solution of a water-soluble salt of the dithiocarbamic acid having a pH above 7 and then adding a water-soluble salt of the heavy metal to the solution in sufficient amount to precipitate the heavy metal salt of the dithiocarbamic acid.

2. The process of preparing a heavy metal salt of a dithiocarbamic acid which comprises adding from about 1% to about 20% of a water-soluble salt of a strong base and a weak acid to an aqueous solution of a water-soluble salt of the dithiocarbamic acid having a pH of from 7 to about 11.5 and then adding a water-soluble salt of the heavy metal to the solution in sufficient amount to precipitate the heavy metal salt of the dithiocarbamic acid.

3. The process of preparing a heavy metal salt of a dithiocarbamic acid which comprises adding from about 1% to about 20% of a water-soluble salt of a strong base and a weak acid to an aqueous solution of a water-soluble salt of an N-aliphatic dithiocarbamic acid having a pH of from 7 to about 11.5 and then adding a water-soluble salt of the heavy metal and a strong acid to the solution in sufficient amount to precipitate the heavy metal salt of the dithiocarbamic acid.

4. The process of preparing a heavy metal salt of a dithiocarbamic acid which comprises adding from about 1% to about 20% of a water-soluble salt of a strong base and a weak acid to an aqueous solution of a water-soluble salt of hexamethylene dithiocarbamic acid having a pH of from 7 to about 11.5 and then adding a water-soluble salt of the heavy metal and a strong acid to the solution in sufficient amount to precipitate the heavy metal salt of the dithiocarbamic acid.

5. The process of preparing the zinc salt of a dithiocarbamic acid which comprises adding from about 1% to about 20% of a water-soluble salt of a strong base and a weak acid to an aqueous solution of a water-soluble salt of the dithiocarbamic acid having a pH of from 7 to about 11.5 and then adding a water-soluble zinc salt of a strong acid to the solution in sufficient amount to precipitate the zinc salt of the dithiocarbamic acid.

6. The process of preparing the zinc salt of a dithiocarbamic acid which comprises adding from about 1% to about 20% of a water-soluble salt of a strong base and a weak acid to an aqueous solution of a water-soluble salt of an N-aliphatic dithiocarbamic acid having a pH of from 7 to about 11.5 and then adding water-soluble zinc salt of a strong acid to the solution in sufficient amount to precipitate the zinc salt of the dithiocarbamic acid.

7. The process of preparing the zinc salt of hexamethylene dithiocarbamic acid which comprises adding from about 1% to about 20% of a water-soluble salt of a strong base and a weak acid to an aqueous solution of a water-soluble salt of hexamethylene dithiocarbamic acid having a pH of from 7 to about 11.5 and then adding a water-soluble zinc salt of a strong acid to the solution in sufficient amount to precipitate the zinc salt of the dithiocarbamic acid.

8. The process of preparing a heavy metal salt of a dithiocarbamic acid which comprises adding from about 1% to about 20% of a water-soluble salt of a strong base and a weak lower saturated aliphatic carboxylic acid to an aqueous solution of a water-soluble salt of the dithiocarbamic acid having a pH above 7 and then adding a water-soluble salt of the heavy metal and a strong acid to the solution in sufficient amount to precipitate the heavy metal salt of the dithiocarbamic acid.

9. The process of preparing a heavy metal salt of a dithiocarbamic acid which comprises adding from about 1% to about 20% of a water-soluble salt of a strong base and a weak lower saturated aliphatic carboxylic acid to an aqueous solution of a water-soluble salt of the dithiocarbamic acid having a pH of from about 7 to about 11.5 and then adding a water-soluble salt of the heavy metal and a strong acid to the solution in sufficient amount to precipitate the heavy metal salt of the dithiocarbamic acid.

10. The process of preparing a heavy metal salt of a dithiocarbamic acid which comprises adding from about 1% to about 20% of a water-soluble salt of a strong base and a weak lower saturated aliphatic carboxylic acid to an aqueous solution of a water-soluble salt of an N-aliphatic dithiocarbamic acid having a pH of from 7 to about 11.5 and then adding a water-soluble salt of the heavy metal and a strong acid to the solution in sufficient amount to precipitate the heavy metal salt of the dithiocarbamic acid.

11. The process of preparing a heavy metal salt of hexamethylene dithiocarbamic acid which comprises adding from about 1% to about 20% of a water-soluble salt of a strong base and a weak lower saturated aliphatic carboxylic acid to an aqueous solution of a water-soluble salt of hexamethylene dithiocarbamic acid having a pH of from 7 to about 11.5 and then adding a water-soluble salt of the heavy metal and a strong acid to the solution in sufficient amount to precipitate the heavy metal salt of the dithiocarbamic acid.

12. The process of preparing the zinc salt of a dithiocarbamic acid which comprises adding from about 1% to about 20% of a water-soluble salt of a strong base and a weak lower saturated aliphatic carboxylic acid to an aqueous solution of a water-soluble salt of the dithiocarbamic acid having a pH of from 7 to about 11.5 and then adding a water-soluble zinc salt of a strong acid to the solution in sufficient amount to precipitate the zinc salt of the dithiocarbamic acid.

13. The process of preparing the zinc salt of a dithiocarbamic acid which comprises adding from about 1% to about 20% of a water-soluble salt of a strong base and a weak lower saturated aliphatic carboxylic acid to an aqueous solution of a water-soluble salt of an N-aliphatic dithiocarbamic acid having a pH of from 7 to about 11.5 and then adding water-soluble zinc salt of a strong acid to the solution in sufficient amount to precipitate the zinc salt of the dithiocarbamic acid.

14. The process of preparing the zinc salt of hexamethylene dithiocarbamic acid which comprises adding from about 1% to about 20% of a water-soluble salt of a strong base and a weak lower saturated aliphatic carboxylic acid to an aqueous solution of a water-soluble salt of hexamethylene dithiocarbamic acid having a pH of from 7 to about 11.5 and then adding a water-soluble zinc salt of a strong acid to the solution in sufficient amount to precipitate the zinc salt of the dithiocarbamic acid.

15. The process of preparing a heavy metal salt of a dithiocarbamic acid which comprises adding from about 1% to about 20% of sodium acetate to an aqueous solution of a water-soluble salt of the dithiocarbamic acid having a pH above 7 and then adding a water-soluble salt of the heavy metal and a strong acid to the solution in sufficient amount to precipitate the heavy metal salt of the dithiocarbamic acid.

16. The process of preparing heavy metal salt of a dithiocarbamic acid which comprises adding from about 1% to about 20% of sodium acetate to an aqueous solution of a water-soluble salt of the dithiocarbamic acid having a pH of from 7 to about 11.5 and then adding a water-soluble salt of the heavy metal and a strong acid to the solution in sufficient amount to precipitate the heavy metal salt of the dithiocarbamic acid.

17. The process of preparing the zinc salt of hexamethylene dithiocarbamic acid which comprises adding from about 1% to about 20% of sodium acetate to an aqueous solution of a water-soluble salt of hexamethylene dithiocarbamic acid having a pH of from 7 to about 11.5 and then adding a water-soluble zinc salt of a strong acid to the solution in sufficient amount to precipitate the zinc salt of the dithiocarbamic acid.

ARTHUR M. NEAL.
BERNARD M. STURGIS.